(12) United States Patent
Tsai et al.

(10) Patent No.: US 12,123,098 B2
(45) Date of Patent: Oct. 22, 2024

(54) GAS PERMEABLE METAL WITH POROSITY GRADIENT AND METHOD OF MANUFACTURING THE SAME

(71) Applicant: NATIONAL KAOHSIUNG UNIVERSITY OF SCIENCE AND TECHNOLOGY, Kaohsiung (TW)

(72) Inventors: Meng-Hsiu Tsai, Kaohsiung (TW); Chun-Wei Chiu, Kaohsiung (TW)

(73) Assignee: National Kaohsiung University of Science and Technology, Kaohsiung (TW)

( * ) Notice: Subject to any disclaimer, the term of this patent is extended or adjusted under 35 U.S.C. 154(b) by 0 days.

(21) Appl. No.: 18/062,704

(22) Filed: Dec. 7, 2022

(65) Prior Publication Data
US 2024/0141505 A1  May 2, 2024

(30) Foreign Application Priority Data
Nov. 2, 2022 (TW) .................................. 111141824

(51) Int. Cl.
C23C 30/00 (2006.01)
(52) U.S. Cl.
CPC .................................... C23C 30/00 (2013.01)
(58) Field of Classification Search
None
See application file for complete search history.

(56) References Cited

U.S. PATENT DOCUMENTS

2012/0121999 A1* 5/2012 Laurencin ........... H01M 4/8642
429/480

FOREIGN PATENT DOCUMENTS

| CN | 106867016 A | 6/2017 |
| CN | 105922514 B | 1/2018 |
| CN | 107868899 B | 3/2020 |
| TW | I269814 B | 1/2007 |
| TW | 201929982 A | 8/2019 |

* cited by examiner

Primary Examiner — Adam Krupicka
(74) Attorney, Agent, or Firm — Rosenberg, Klein & Lee

(57) ABSTRACT

A gas permeable metal with a porosity gradient and a method of manufacturing the same are provided. A second lamination layer and a third lamination layer are respectively connected to two opposite sides of a first lamination layer. A pore diameter of the first lamination layer is larger than that of the second lamination layer. Thereby while being applied to molds, a mold cavity is mounted in the second lamination layer with smaller pore diameter so that products formed have fine and smooth surfaces. The arrangement of the first lamination layer with larger pore diameter is used for effective escape of gas generated during product production process. According to production requirements for products, a pore diameter of the third lamination layer can be adjusted to be not larger than that of the first lamination layer. Thus mechanical strength and gas exhaust capacity can be balanced.

4 Claims, 7 Drawing Sheets

GAS PERMEABLE METAL WITH POROSITY GRADIENT AND METHOD OF MANUFACTURING THE SAME

BACKGROUND OF THE INVENTION

Field of the Invention

The present invention relates to a layered product, especially to a gas permeable metal with a porosity gradient and a method of manufacturing the same.

Description of Related Art

Refer to Taiwanese Pat. Gazette No. 1269814B "method of manufacturing gas permeable die steel", Taiwanese Pat. Pub. No. 201929982A "porous metal and method of manufacturing the same", Chinese Pat. Pub. No. CN107868899B "gas permeable steel for injection molding and method of preparing the same", Chinese Pat. Pub. No. CN105922514B "mould with relatively good ventilating and cooling effects", and Chinese Pat. Pub. No. CN106867016A "sintering method and device for preparing porous polymer material", methods of manufacturing permeable metals are revealed in these prior arts. Most of the method uses high temperature sintering of metal powder so that metal products manufactured have gas permeability. However, pores of the sintered metal have different sizes and irregular shapes. The pores are scattered randomly and lack of continuity. The respective pores are not connected continuously so that the gas permeability is limited. While in use, there is still a problem of poor venting. Moreover, when the metal is sintered in a loose way for better venting, its hardness is significantly reduced and mechanical properties are impaired. A surface quality of injection molding products is also difficult to control. Once the metal is sintered in a denser way, the mechanical strength and surface quality of the injection molding products are ensured. Yet a large amount of gas is generated during molding process and unable to move out of the mold cavity. Thus air traps, welding line, short shot might occur.

SUMMARY OF THE INVENTION

Therefore, it is a primary object of the present invention to provide a gas permeable metal with a porosity gradient and a method of manufacturing the same. The gas permeable metal produced has good mechanical strength. Air traps generated during product production process can be eliminated effectively and surface quality of the products made of the gas permeable metal can be ensured In order to achieve the above objects, a gas permeable metal with a porosity gradient according to the present invention mainly includes a second lamination layer and a third lamination layer respectively connected to two opposite sides of a first lamination layer. A pore diameter of the first lamination layer is larger than that of the second lamination layer. Thereby a mold cavity is mounted in the second lamination layer with smaller pore diameter so that products formed have fine and smooth surfaces while the pas permeable metal being applied to molds. The disposition of the first lamination layer with larger pore diameter allows effective escape of gas generated during product production process. According to production requirements for products, a pore diameter of the third lamination layer can be adjusted to be smaller than or equal to that of the first lamination layer. Thus mechanical strength and gas exhaust capacity of the products produced by the gas permeable metal can be balanced.

The gas permeable metal according to the present invention has the following advantages.
1. By the mold cavity mounted in the second lamination layer with smaller pore diameter, products formed in the mold cavity by injection molding have fine and smooth surfaces. The first lamination layer with larger pore diameter allows a large amount of gas generated during product production process to be dissipated effectively for eliminating air traps caused by air caught inside the mold cavity.
2. By the present method, the pore size of the third lamination layer located outside the first lamination layer can be adjusted according to production requirements for products. Thus mechanical strength and gas exhaust capacity of the mold produced by the gas permeable metal can be balanced.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
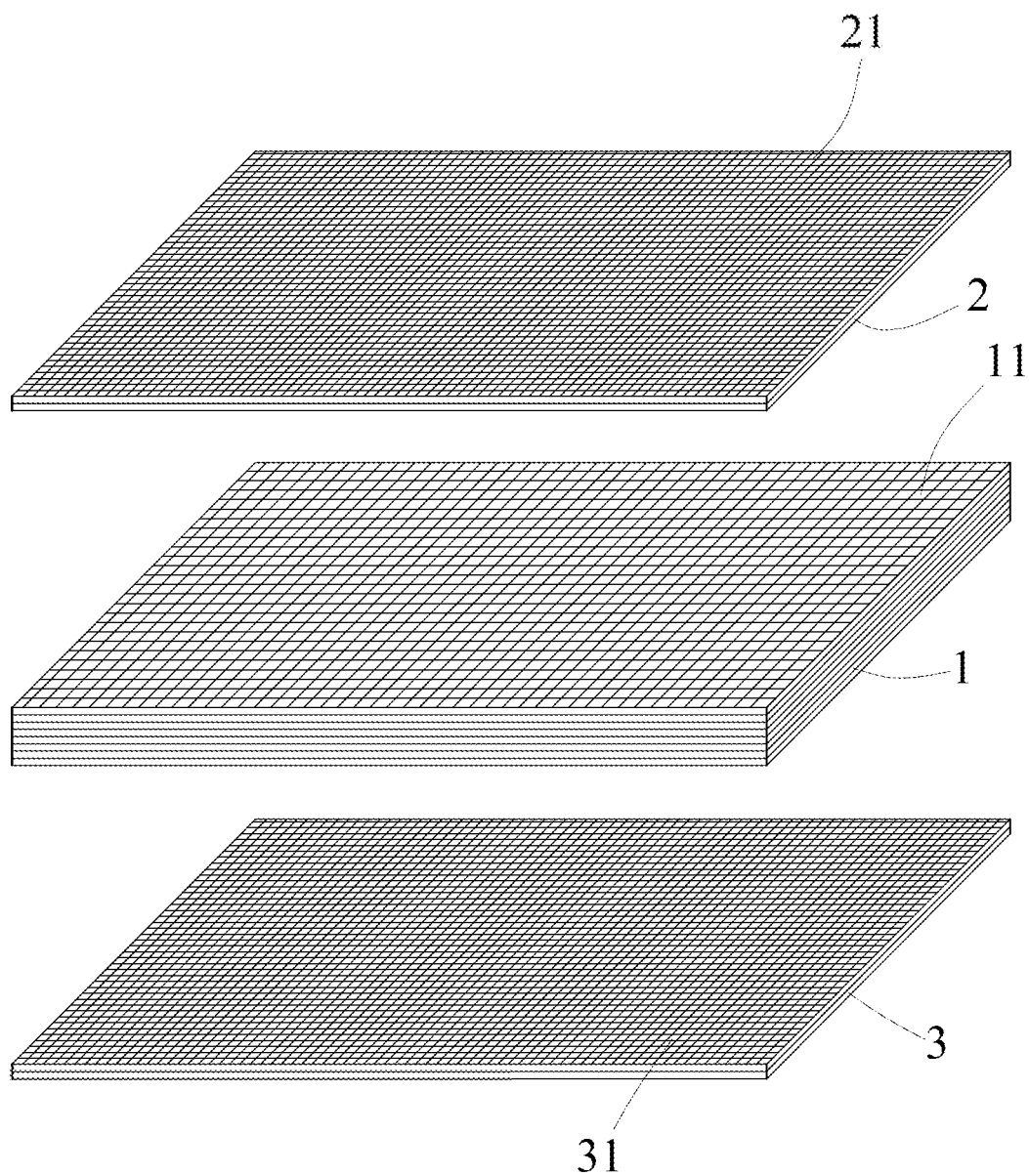
FIG. 1 is an exploded view of an embodiment according to the present invention.
Figure 2:
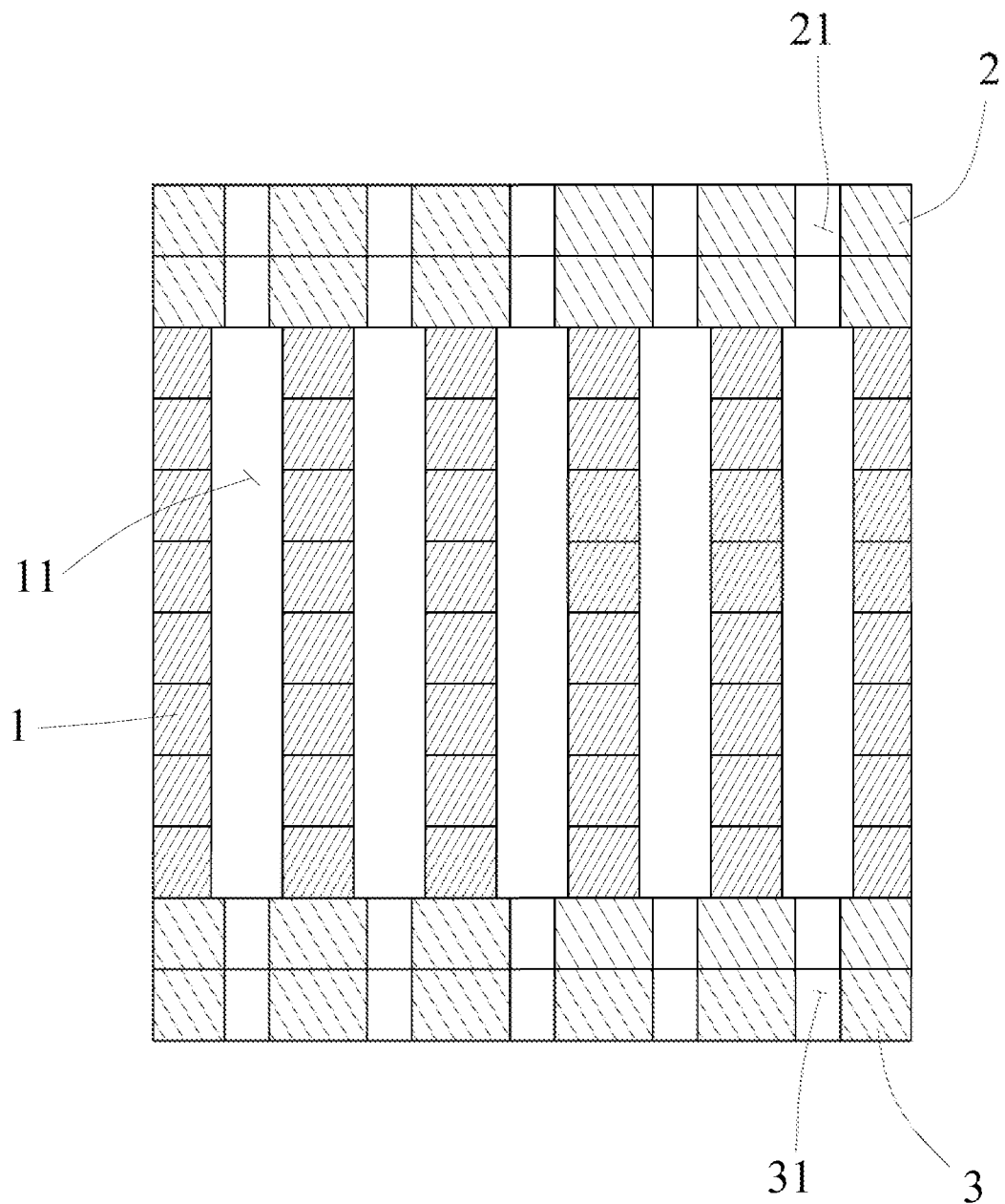
FIG. 2 is a sectional view of an embodiment according to the present invention.

Refer to FIG. 1 and FIG. 2, a gas permeable metal with a porosity gradient according to the present invention includes a first lamination layer 1 with a first surface and a second surface opposite to each other, a second lamination layer 2 connected with the first surface of the first lamination layer 1, and a third lamination layer 3 connected with the second surface of the first lamination layer 1. The first lamination layer 1, the second lamination layer 2, and the third lamination layer 3 are respectively provided with a plurality of first pores 11, a plurality of second pores 21, and a plurality of third pores 31. The first pores 11 of the first lamination layer 1, the second pores 21 of the second lamination layer 2, and the third pores 31 of the third lamination layer 3 corresponds to and are communicated with one another. A diameter of each of the second pores 21 is smaller than a diameter of each of the first pores 11 while a diameter of each of the third pores 31 is smaller than or equal to the diameter of each of the first pores 11. The diameter of each of the first pores 11 of the first lamination layer 1 is larger than 80 micrometers (μm) and the diameter of each of the second pores 21 of the second lamination layer 2 is smaller than 50 μm while the diameter of each of the third pores 31 of the third lamination layer 3 is larger than 80 μm or smaller than 50 μm.

Figure 3:
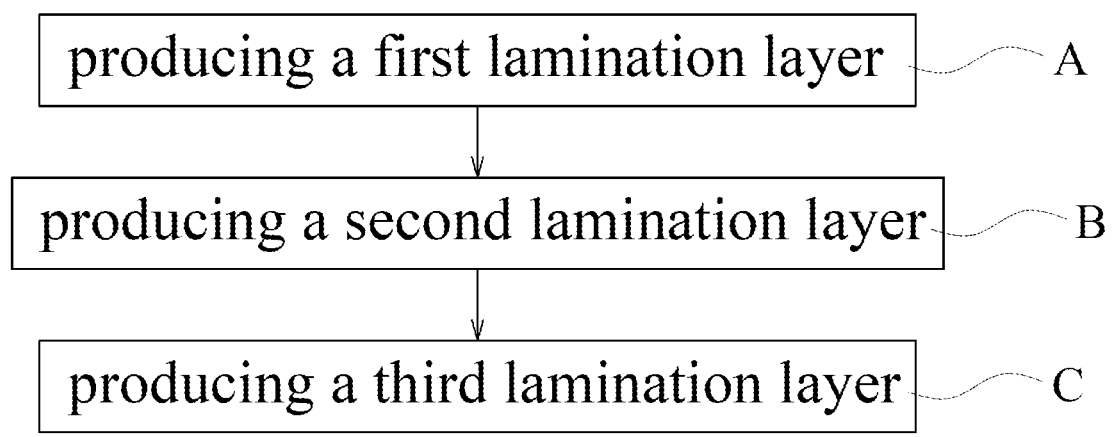
FIG. 3 is a flow chart showing steps of an embodiment according to the present invention.

As shown in FIG. 3, a method of manufacturing a gas permeable metal with a porosity gradient according to the present invention has the following steps.

Figure 4:
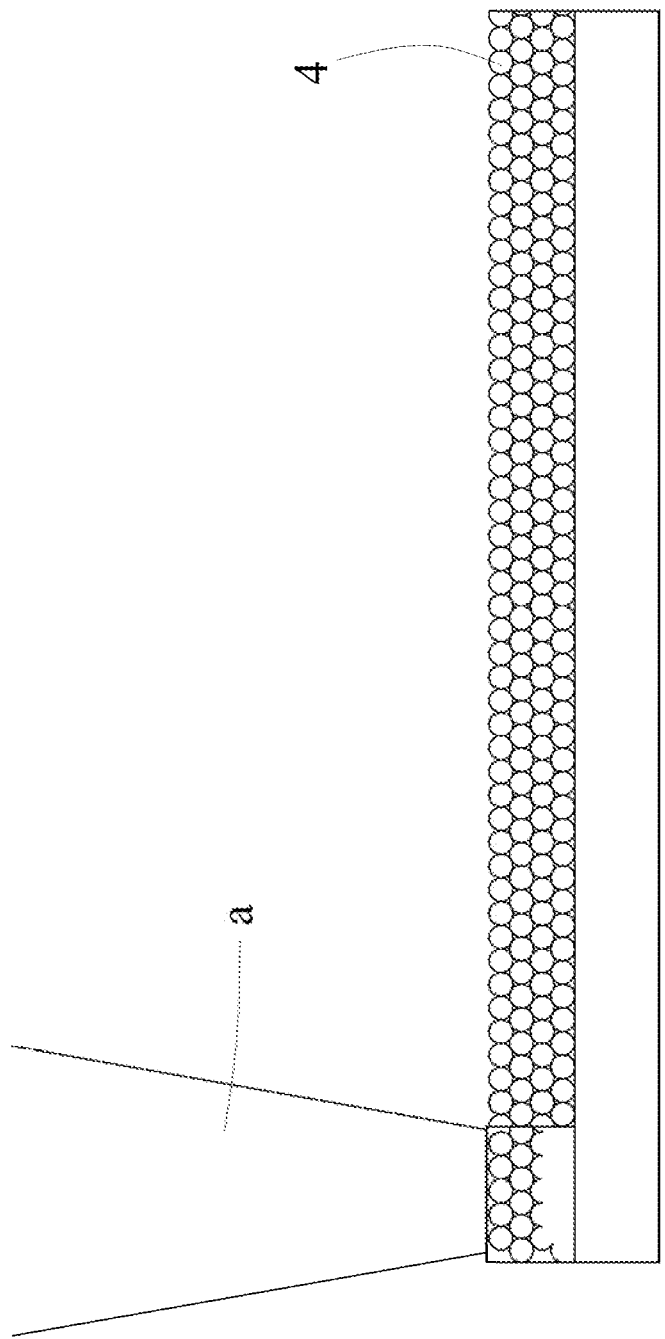
FIG. 4 is a schematic drawing showing scanning of a laser beam of an embodiment according to the present invention.
Figure 5:
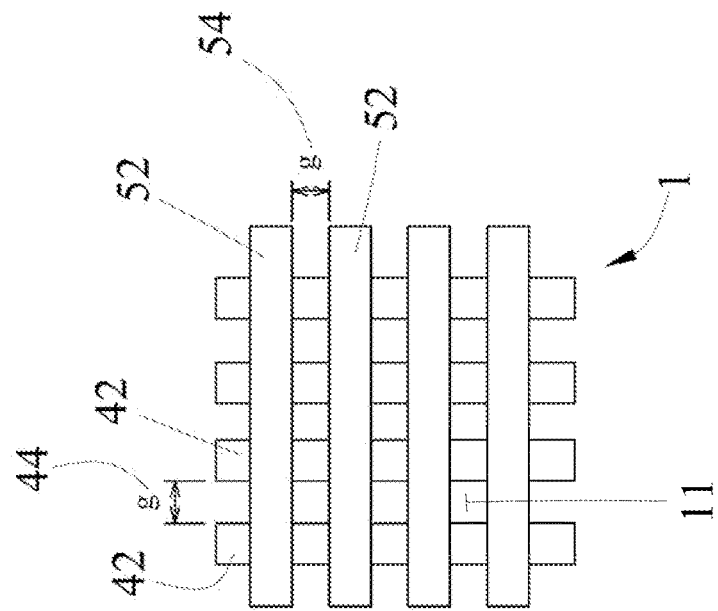
FIG. 5 is a schematic drawing showing a first deposited layer and a second deposited layer scanned by a laser beam of an embodiment according to the present invention.
Figure 5:
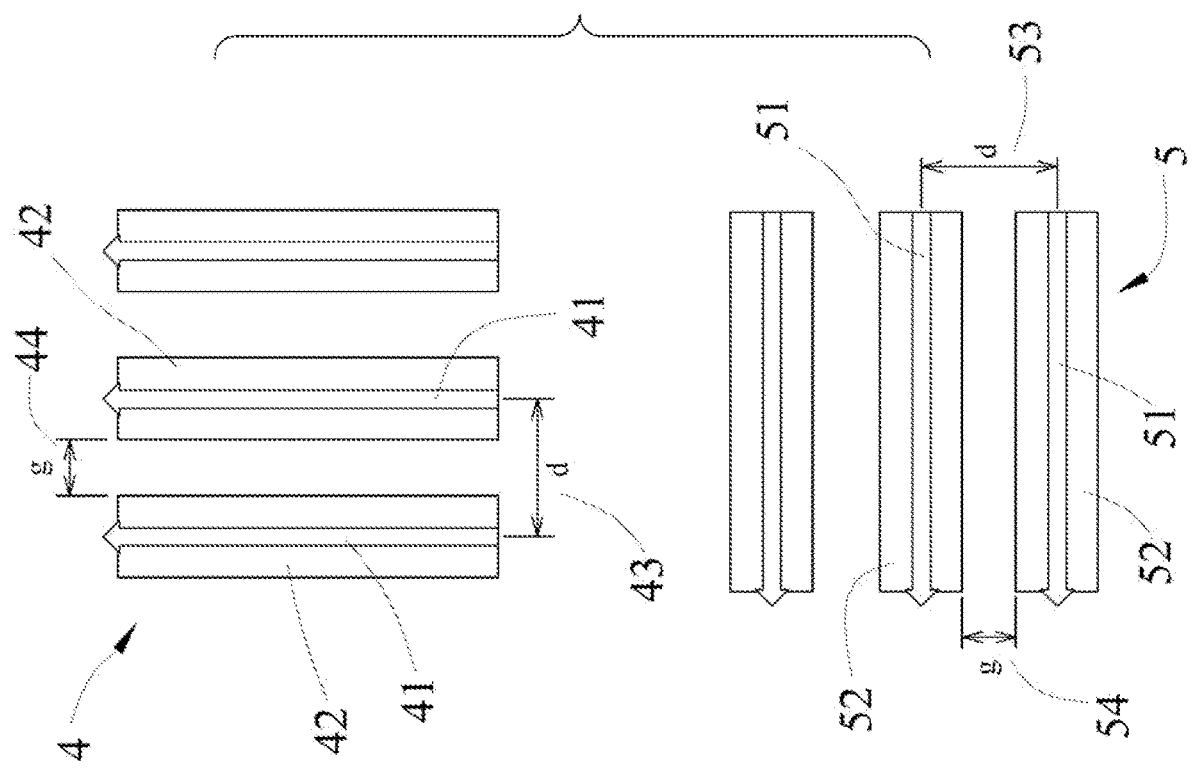

A. producing a first lamination layer. As shown in FIG. 4 and FIG. 5, a plurality of metal particles is laid tightly to form a first deposited layer 4 and then a laser beam (a) is used to carry out scanning of a plurality of parallel first linear paths 41 spaced apart from one another over the first deposited layer 4. A width of first metal pool 42 is formed along with the first linear path 41 of the first deposited layer 4 and is set to 70-150 micrometers (μm). A first hatch distance 43 (hatch distance, represented as "d" in the Figures) formed between the two adjacent first linear paths 41 of the first deposited layer 4 is larger than the width of first metal pool 42 and set to 150-300 μm. A first gap 44 (gap, represented as "g" in the Figures) is formed due to a difference between the width of first metal pool 42 and the first hatch distance 43 of the first deposited layer 4. The first gap 44 is equal to the first hatch distance 43 minus the width of first metal pool 42 and is larger than 80 μm. Next pave the first deposited layer 4 with a plurality of metal particles firmly to form a second deposited layer 5. Then the laser beam (a) is used to carry out scanning of a plurality of parallel second linear paths 51 spaced apart from one another over the second deposited layer 5. There is an angle formed between the second linear path 51 of the second deposited layer 5 and the first linear path 41 of the first deposited layer 4. A width of second metal pool 52 is formed along with the second linear path 51 of the second deposited layer 5 and a second hatch distance 53 which is formed between the two adjacent second linear paths 51 of the second deposited layer 5 is larger than the width of second metal pool 52 while a second gap 54 is formed due to a difference between the width of second metal pool 52 and the second hatch distance 53 of the second deposited layer 5. The width of second metal pool 52 and the second hatch distance 53 of the second deposited layer 5 are respectively set to 70-150 μm and 150-300 μm while the second gap 54 of the second deposited layer 5 is larger than 80 μm. The first gaps 44 of the first deposited layer 4 and the second gaps 54 of the second deposited layer 5 cross over each other to form a plurality of first pores 11 arranged in a grid array while a diameter of each of the first pores 11 is larger than 80 μm. An angle formed between the first and the second gaps 44, 54 of the first and the second deposited layers 4, 5 crossed over each other can be $^{2nd}gap=^{1st}\cos(90-\theta)$ and 90 degrees is preferred. Next a plurality of first deposited layers 4 and a plurality of second deposited layers 5 are stacked in turn according to the above process to form the first lamination layer 1 with a preset thickness. The first pores 11 formed by the first and the second gaps 44, 54 of the first and the second deposited layers 4, 5 crossed over each other correspond to one another so as to form the continuous first pores 11 penetrating the first lamination layer 1.

Figure 6:
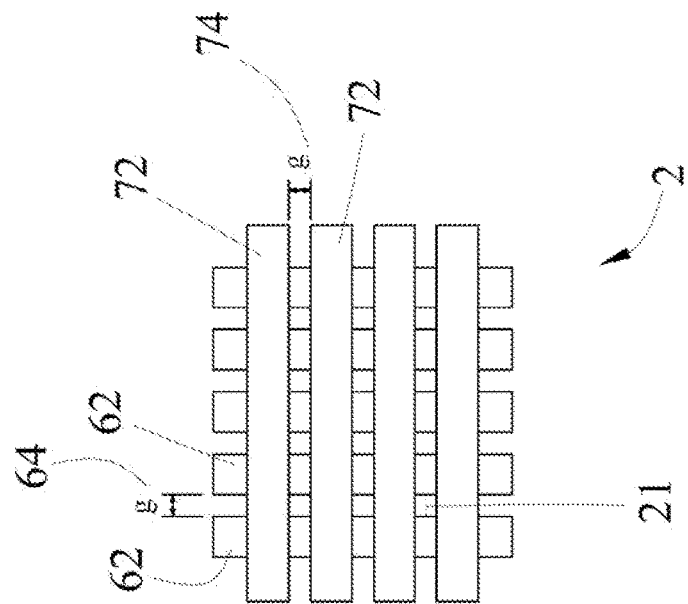
FIG. 6 is a schematic drawing showing a third deposited layer and a fourth deposited layer scanned by a laser beam of an embodiment according to the present invention.
Figure 6:
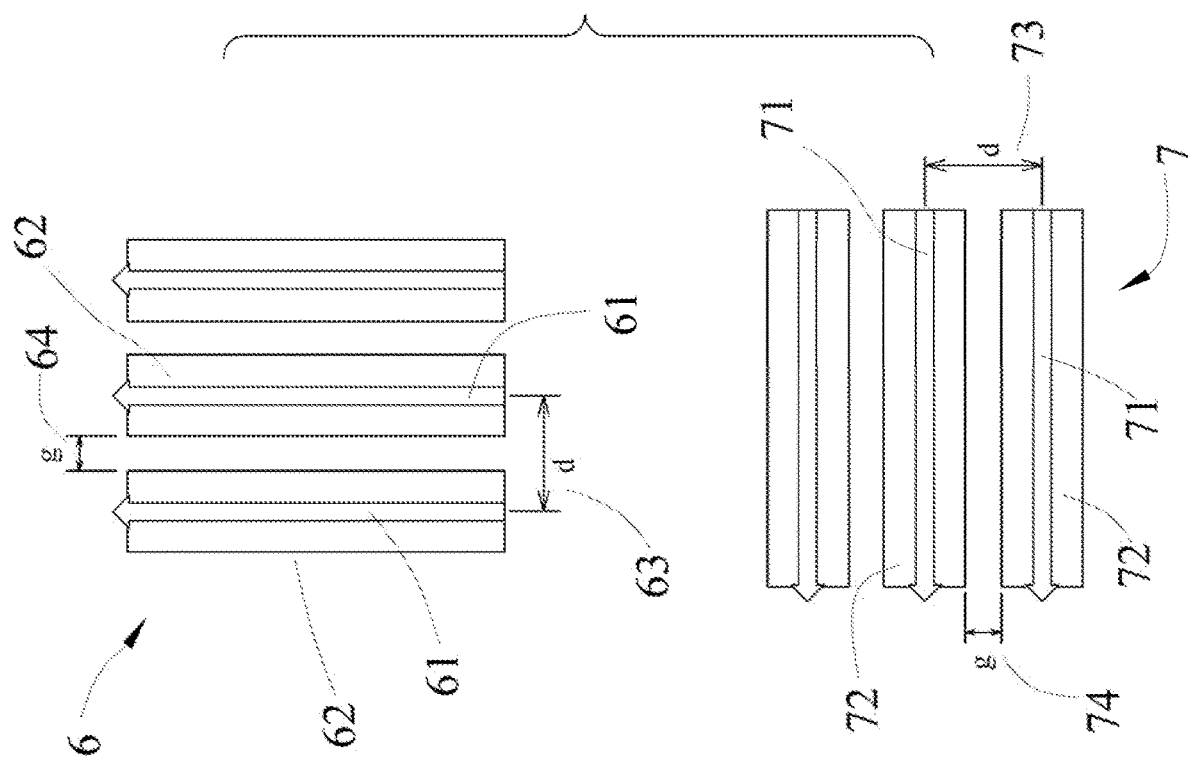

B. producing a second lamination layer. Refer to FIG. 6, lay a plurality of metal particles tightly on the first surface of the first lamination layer 1 to form a third deposited layer 6 and then the laser beam (a) is used to carry out scanning of a plurality of parallel third linear paths 61 spaced apart from one another over the third deposited layer 6. A width of third metal pool 62 is formed along with the third linear path 61 of the third deposited layer 6 and is set to 70-150 μm. A third hatch distance 63 which is formed between the two adjacent third linear paths 61 of the third deposited layer 6 is larger than the width of third metal pool 62 and set to 120-200 μm. A third gap 64 which is formed due to a difference between the width of third metal pool 62 and the third hatch distance 63 of the third deposited layer 6 is smaller than 50 μm. Next pave the third deposited layer 6 with a plurality of metal particles firmly to form a fourth deposited layer 7. Then the laser beam (a) is used to carry out scanning of a plurality of parallel fourth linear paths 71 spaced apart from one another over the fourth deposited layer 7. There is an angle formed between the linear fourth path 71 of the fourth deposited layer 7 and the third linear path 61 of the third deposited layer 6. A width of fourth metal pool 72 is formed along with the fourth linear path 71 of the fourth deposited layer 7 and a fourth hatch distance 73 formed between the two adjacent fourth linear paths 71 of the fourth deposited layer 7 is larger than the width of fourth metal pool 72 while a fourth gap 74 is formed due to a difference between the width of fourth metal pool 72 and the fourth hatch distance 73 of the fourth deposited layer 7. The width of fourth metal pool 72 and the fourth hatch distance 73 of the fourth deposited layer 7 are respectively set to 70-150 μm and 120-200 μm while the fourth gap 74 of the fourth deposited layer 7 is smaller than 50 μm. The third gaps 64 of the third deposited layer 6 and the fourth gaps 74 of the fourth deposited layer 7 cross over each other to form a plurality of second pores 21 arranged in a grid array while a diameter of each of the second pores 21 is smaller than 50 μm. An angle formed between the third and the fourth gaps 64, 74 of the third and the fourth deposited layers 6, 7 crossed over each other can be $^{4th}gap=^{3rd}\cos(90-\theta)$ and 90 degrees is preferred. Next at least one third deposited layer 6 and at least one fourth deposited layer 7 are stacked in turn according to the above process to form the second lamination layer 2 with a preset thickness. The second pores 21 formed by the third and the fourth gaps 64, 74 of the third and the fourth deposited layers 6, 7 crossed over each other correspond to one another so that the second pores 21 formed are continuous and penetrate the second lamination layer 2. The second pores 21 of the second lamination layer 2 correspond to and are communicated with the first pores 11 of the first lamination layer 1.

Figure 7:
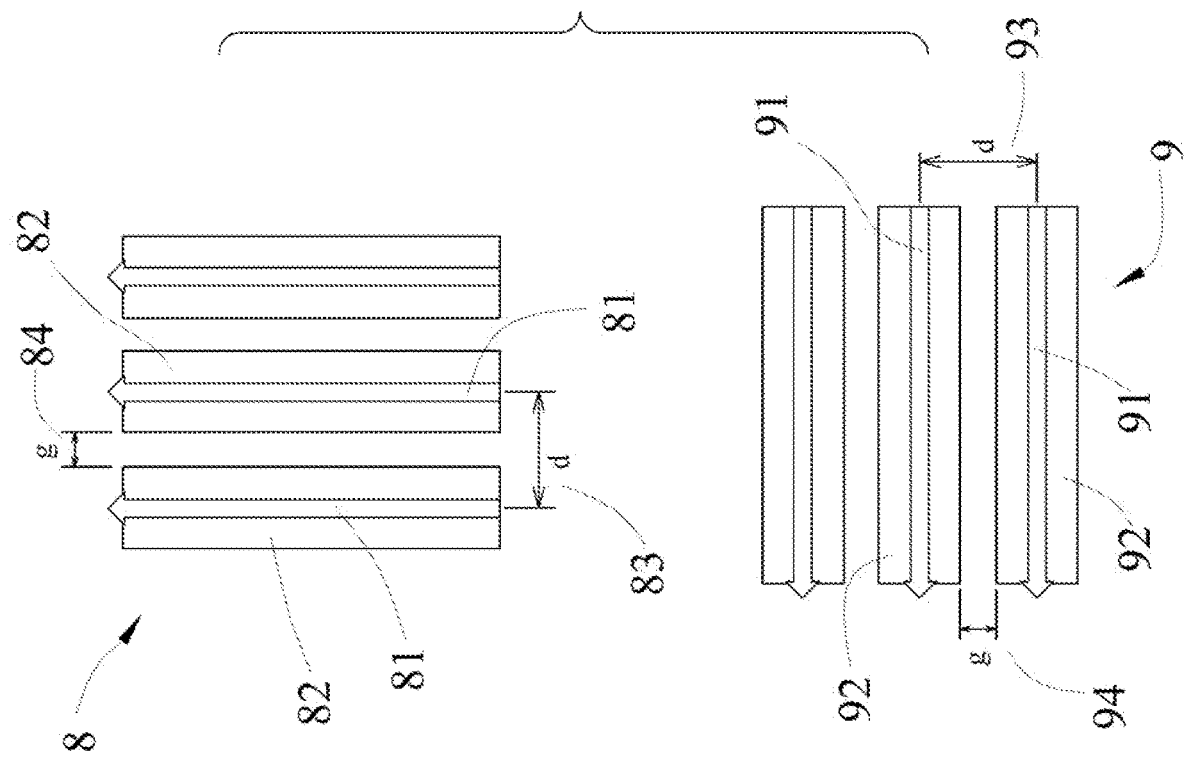
FIG. 7 is a schematic drawing showing a fifth deposited layer and a sixth deposited layer scanned by a laser beam of an embodiment according to the present invention.

C. producing a third lamination layer. As shown in FIG. 7, pave the second surface of the first lamination layer 1 with a plurality of metal particles firmly to form a fifth deposited layer 8 and then the laser beam (a) is used to carry out scanning of a plurality of parallel fifth linear paths 81 spaced apart from one another over the fifth deposited layer 8. A width of fifth metal pool 82 is formed along with the fifth linear path 81 of the fifth deposited layer 8 and is set to 70-150 μm. A fifth hatch distance 83 formed between the two adjacent fifth linear paths 81 of the fifth deposited layer 8 is larger than the width of fifth metal pool 82 of the fifth linear path 81 and set to 150-300 μm or 120-200 μm. A fifth gap 84 is formed due to a difference between the width of fifth metal pool 82 and the fifth hatch distance 83 of the fifth deposited layer 8. The fifth gap 84 of the fifth deposited layer 8 is larger than 80 μm or smaller than 50 μm. Next lay a plurality of metal particles firmly on the fifth deposited layer 8 to form a sixth deposited layer 9. Then over the sixth deposited layer 9, use the laser beam (a) to carry out scanning of a plurality of parallel sixth linear paths 91 spaced apart from one another. An angle is formed between the sixth linear path 91 of the sixth deposited layer 9 and the fifth linear path 81 of the fifth deposited layer 8. A width of sixth metal pool 92 is formed along with the sixth linear path 91 of the sixth deposited layer 9 and a sixth hatch distance 93 formed between the two adjacent sixth linear paths 91 of the sixth deposited layer 9 is larger than the width of sixth metal pool 92 while a sixth gap 94 is formed due to a difference between the width of sixth metal pool 92 and the sixth hatch distance 93 of the sixth deposited layer 9. The width of sixth metal pool 92 of the sixth deposited layer 9 is set to 70-150 μm and the sixth hatch distance 93 is set to 150-300 μm or 120-200 μm while the sixth gap 94 is larger than 80 μm or smaller than 50 μm. The fifth gaps 84 of the fifth deposited layer 8 and the sixth gaps 94 of the sixth deposited layer 9 cross over each other to form a plurality of third pores 31 arranged in a grid array while a diameter of each of the third pores 31 is larger than 80 μm or smaller than 50 μm. An angle between the fifth and the sixth gaps 84, 94 of the fifth and the sixth deposited layers 8, 9 crossed over each other can be $^{6th}\text{gap}=^{5th}\cos(90-\theta)$ and 90 degrees is preferred. Next at least one fifth deposited layer 8 and at least one sixth deposited layer 9 are stacked in turn according to the above process to form the third lamination layer 3 with a preset thickness. The third pores 31 formed by the fifth and the sixth gaps 84, 94 of the fifth and the sixth deposited layers 8, 9 crossed over each other correspond to one another so that the third pores 31 are continuous and penetrate the third lamination layer 3. The third pores 31 of the third lamination layer 3 correspond to and are communicated with the first pores 11 of the first lamination layer 1.

Thereby a gas permeable metal with a porosity gradient can be manufactured easily and conveniently by the above method according to the present invention. When the present gas permeable metal with a porosity gradient is used in production of molds, a mold cavity is arranged at the second lamination layer 2 with the pore diameter smaller than 50 μm. Thus products formed in the mold cavity have fine and smooth surfaces. The design of the first lamination layer 1 with the pore diameter larger than 80 μm is beneficial to exhaust of a large amount of gas generated during injection molding process of plastic products. Thus air traps caused by air caught inside the mold cavity can be eliminated effectively. As to the third lamination layer 3 on an outer side of the mold, its pore diameter can be adjusted to be smaller than 50 μm or larger than 80 μm according to production requirements for products. Thus mechanical strength and gas exhaust capacity of the mold can be balanced. Thereby the gas permeable metal with a porosity gradient according to the present invention not only improves gas escape of the mold effectively for eliminating the air traps occurred during injection molding of the plastic products, but also ensures surface quality of the injection molding products and the mechanical strength of the mold. After measurement, the mechanical strength of the mold produced by the gas permeable metal of the present invention reaches HRC (Rockwell hardness C scale) 40-50.

Moreover, the gas permeable metal having pores with size, shape, and distribution patterns required can be manufactured easily and conveniently by the method according to the present invention. The continuity of the pores can also be ensured. While being applied to molds, the molds produced by the present gas permeable metal have excellent air permeability, without blocking or interrupting the escape of the gas. Good pressure relief is provided to prevent damages caused by pressure difference during demoulding of the injection molding products. The impact of the trapped air on the products is minimized.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A mold having a wall defining a mold cavity, the wall of the mold being formed from a gas permeable metal with a porosity gradient, comprising:
    a first lamination layer having a first surface and a second surface arranged opposite to each other, and at least a second lamination layer connected to the first surface of the first lamination layer, wherein the first lamination layer and at least the second lamination layer are formed, by means of a laser scanning, with a plurality of first pores and a plurality of second pores, respectively, wherein the first pores of the first lamination layer are aligned with respective ones of the second pores of the second lamination layer and are communicated with each other, wherein a second diameter of each of the second pores is smaller than a first diameter of each of the first pores, and wherein the second lamination layer forms an internal surface of the mold wall, the mold cavity being disposed in a direct contact with the second lamination layer of the gas permeable metal, thus permitting fabrication of a plastic product in said mold cavity having a smooth surface corresponding to said second diameter of the second pores, and wherein said first lamination layer forms an external surface of said mold wall for an enhanced exhaust through the first pores of a gas generated during an injection molding of the plastic product in the mold cavity, thus eliminating an air trap caused by air caught within the mold cavity.

2. The mold as claimed in claim 1, wherein the first diameter of each of the first pores of the first lamination layer is larger than 80 micrometers (μm) and the second diameter of each of the second pores of the second lamination layer is smaller than 50 μm.

3. The mold as claimed in claim 1, wherein the gas permeable metal with a porosity gradient further includes a third lamination layer which is connected to the second surface of the first lamination layer and is formed, by means of a laser scanning, with a plurality of third pores, wherein the third pores of the third lamination layer are aligned with corresponding ones of the first pores of the first lamination layer and are communicated with each other, wherein, when a third diameter of each of the third pores is smaller than the first diameter of each of the first pores, a mechanical strength of the mold wall is enhanced, and wherein, when the third diameter of each of the third pores is equal to the first diameter of each of the first pores, the air trap occurred during injection molding of the plastic product is eliminated.

4. The mold as claimed in claim 3, wherein the first diameter of each of the first pores of the first lamination layer is larger than 80 μm and the third diameter of each of the third pores of the third lamination layer is larger than 80 μm or smaller than 50 μm.

* * * * *